US008788342B2

(12) United States Patent
Hu et al.

(10) Patent No.: US 8,788,342 B2
(45) Date of Patent: Jul. 22, 2014

(54) INTELLIGENT FEATURE EXPANSION OF ONLINE TEXT ADS

(75) Inventors: Jian Hu, Beijing (CN); Hao Zheng, Saratogo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 12/935,283

(22) PCT Filed: Mar. 4, 2010

(86) PCT No.: PCT/CN2010/000261
§ 371 (c)(1),
(2), (4) Date: Sep. 28, 2010

(87) PCT Pub. No.: WO2011/106907
PCT Pub. Date: Sep. 9, 2011

(65) Prior Publication Data
US 2012/0316972 A1    Dec. 13, 2012

(51) Int. Cl.
*G06Q 30/00* (2012.01)
*G06Q 30/02* (2012.01)
(52) U.S. Cl.
CPC ........ *G06Q 30/0244* (2013.01); *G06Q 30/0256* (2013.01); *G06Q 30/0276* (2013.01)
USPC ................... 705/14.54; 705/14.43; 705/14.72
(58) Field of Classification Search
None
See application file for complete search history.

(56) References Cited

U.S. PATENT DOCUMENTS

| 6,212,517 | B1 | 4/2001 | Sato et al. | |
|---|---|---|---|---|
| 7,961,986 | B1 * | 6/2011 | Jing et al. | 382/305 |
| 8,463,783 | B1 * | 6/2013 | Yagnik | 707/737 |
| 2002/0116291 | A1 * | 8/2002 | Grasso et al. | 705/27 |
| 2004/0111453 | A1 * | 6/2004 | Harris et al. | 708/200 |
| 2005/0137939 | A1 * | 6/2005 | Calabria et al. | 705/26 |
| 2005/0289113 | A1 * | 12/2005 | Bookstaff | 707/1 |
| 2006/0041536 | A1 * | 2/2006 | Scholl et al. | 707/3 |
| 2007/0038621 | A1 * | 2/2007 | Weyand et al. | 707/5 |

(Continued)

FOREIGN PATENT DOCUMENTS

| CN | 1932817 A | 3/2007 |
|---|---|---|
| CN | 1206158 A | 1/2009 |
| CN | 101526956 A | 9/2009 |

OTHER PUBLICATIONS

"Probabilistic Query Expansion Using Query Logs," (Hang Cui, Ji-Rong Wen, Jian-Yun Nie, Wei-Ying Ma) Jan. 15, 2000.*

(Continued)

*Primary Examiner* — Rutao Wu
*Assistant Examiner* — James Detweiler
(74) *Attorney, Agent, or Firm* — Brinks Gilson & Lione

(57) ABSTRACT

Embodiments employ knowledge from network searches to enrich features useable to describe an advertisement. Advertisement content may be segmented to generate key phrases that are rank ordered based on a phrase's pointwise mutual information value with Ad keywords and term frequency-inverse document frequency (TF-IDF) scores. These key phrases are employed to generate a plurality of query searches that are performed to generate a plurality of search result snippets. The snippets are then analyzed and ranked to identify query expansion features having a TF-IDF value over a given threshold. A subset of these ranked phrases are combined with the Ad keywords to be used to rebuild an Ad index for the given advertisement. When content is to be delivered to a client device, content keywords are compared to the Ad index to select an advertisement to be provided with the content to the client device.

17 Claims, 6 Drawing Sheets

(56) References Cited

U.S. PATENT DOCUMENTS

| | | | |
|---|---|---|---|
| 2007/0143176 A1* | 6/2007 | Nong et al. | 705/14 |
| 2008/0077570 A1* | 3/2008 | Tang et al. | 707/5 |
| 2008/0270167 A1* | 10/2008 | Wee et al. | 705/1 |
| 2009/0012778 A1* | 1/2009 | Feng et al. | 704/9 |
| 2009/0024554 A1* | 1/2009 | Murdock et al. | 706/48 |
| 2009/0171929 A1* | 7/2009 | Jing et al. | 707/5 |
| 2009/0319518 A1* | 12/2009 | Koudas et al. | 707/5 |

OTHER PUBLICATIONS

"Pointwise Mutual Information," Wikipedia, the free encyclopedia, 3 pages, accessed May 4, 2011 http://en.wikipedia.org/wiki/Pointwise_mutual_information.

"tf-idf" Wikipedia, the free encyclopedia, 4 pages, accessed May 4, 2011 http://en.wikipedia.org/wiki/tf-idf.

International Preliminary Report on Patentability for International PCT/CN/2010/000261, dated Dec. 9, 2010, 4 pages.

* cited by examiner

INTELLIGENT FEATURE EXPANSION OF ONLINE TEXT ADS

CROSS REFERENCE TO RELATED APPLICATIONS

This patent application is a U.S. national phase of International Patent Application No. PCT/CN2010/000261, filed on Mar. 4, 2010; the benefit of which is claimed and the contents of which are incorporated herein by reference in its entirety.

TECHNICAL FIELD

Embodiments relate generally to selection of advertisements for delivery to a client device and, more particularly, but not exclusively to, expanding or enriching features about an advertisement to improve matching of the advertisement to content within a web page, a sponsored search query, or similar activities.

BACKGROUND

Tremendous changes have been occurring in the Internet that influence our everyday lives. For example, in today's society, one of the first activities that a user might perform during their day is to turn on their computers is to communicate with friends, co-workers, family, as well as to read news and/or a variety of other online content. In fact, today, many of a person's social activities are now being conducted over the Internet.

Thus, many people are looking to the Internet to provide them with richer, fuller content that might include live tutorials, movies, music, and yes, even richer advertisements. Many people today have identified advertisements to not only be entertaining, but educational and informative. However, when an advertisement is displayed along with content in an unrelated manner, such advertisements might actually turn out to be distracting to the user. For example, if a user has performed a search on a topic such as tours of China, displaying advertisements about tours of Southern California might be counterproductive. The user might ignore such ads, or find them a distraction. In either event, the user may not click on the advertisement, which results in reduced revenue for the advertiser and possibly for an owner of a web page in which the advertisement is displayed. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
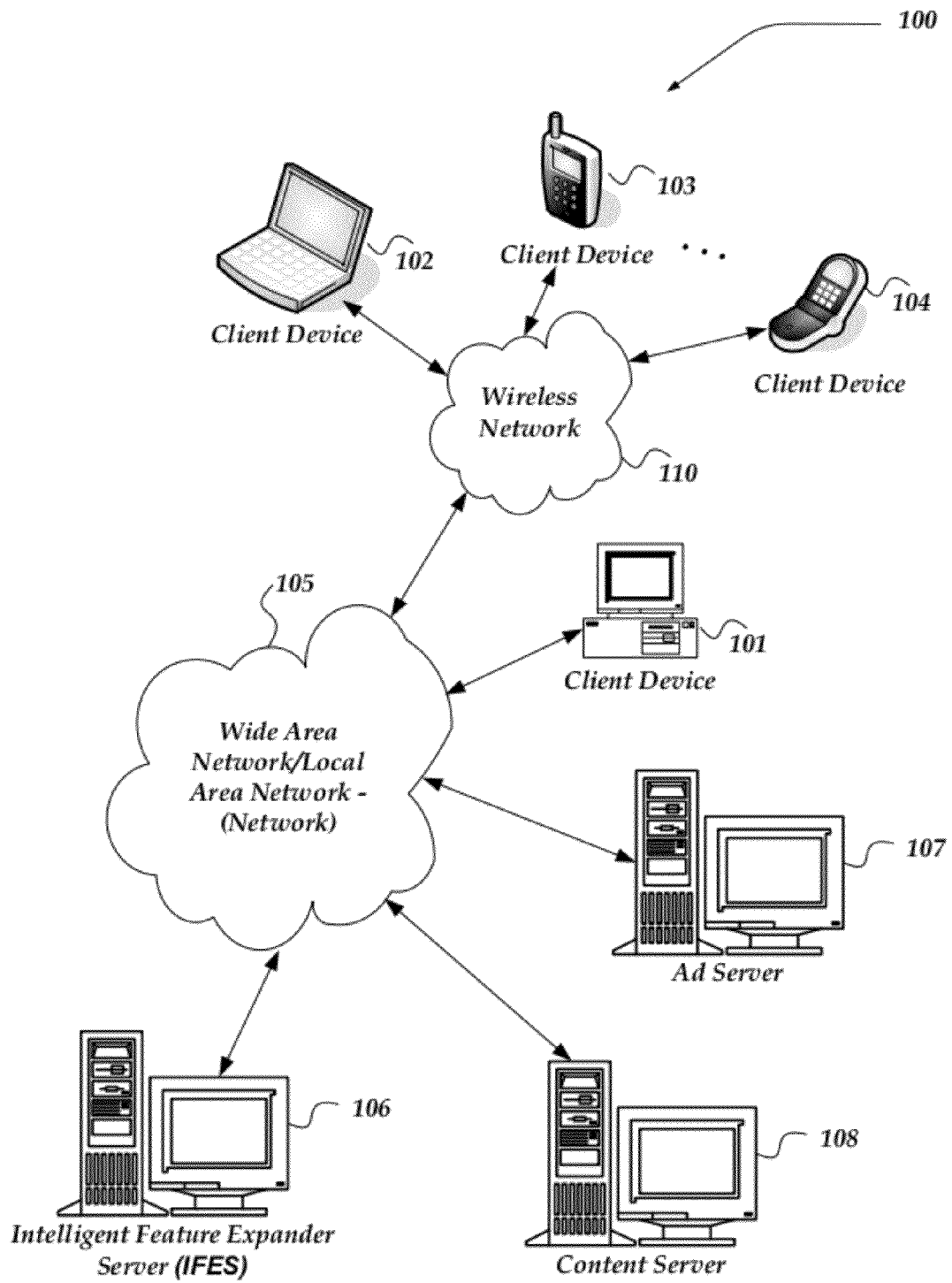
FIG. 1 is a system diagram of one embodiment of an environment in which embodiments of the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" refers to any digital data that may be provided over a network for use by a receiving user. Examples of content include but are not limited to motion pictures, movies, videos, music, interactive media, audios, still images, text, graphics, scripts, applications, and other forms of digital data useable by a computing device. However, content is not limited to these examples, and virtually any digital data may be included, without departing from the scope or spirit of the invention.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards employing knowledge from network searches, such as the Internet, to enrich features useable to describe an advertisement beyond those features provided within an advertisement itself, and/or Ad keywords for the advertisement provided by, for example, by an advertiser. Initially, content from an advertisement may be segmented to generate various phrases that may then be rank ordered based on a sum of a phrase's pointwise mutual information value (PMI) with the provided Ad keywords and based further on term frequency-inverse document frequency (TF-IDF) scores. In one embodiment, a top ranked number of phrases are selected as key phrases. These key phrases are then employed to generate a plurality of queries within a query list based on combinations of the identified key phrases. For each query in the query list, a network search, such as an Internet search or the like, is performed to generate a plurality of search result snippets that describe some aspect or summary of a respective search result. For each query, a given number of search result snippets are further analyzed to identify phrases and/or unigrams having a TF-IDF value over a given threshold. These selected phrases (and/or unigrams) may be denoted as query expansion features for each query. A ranking of these phrases (and/or unigrams) are then performed based on their ranking in each query and their frequency in all query expansion lists. A subset of these ranked phrases is then selected as the ad expanded features, which are then normalized and combined with the Ad keywords to be used to generate or re/build an Ad index for the given advertisement.

When a request for content is received. In one embodiment, the request is for a web page. However, the request may also be a query search request, requesting a search result. Other content may also be requested. In any event, the content keywords associated with the requested content, a content index data store of key words, tags, or the like, are then used to determine if a match above a given threshold is detected for some number of the phrases, unigrams, Ad keywords, within the Ad Index. In one embodiment, the threshold of matches might be one; however, other threshold value for the number of matches might be required before a match is determined to occur for a given advertisement. In any event, if a match is determined to be found, the advertisement is provided to a requester along with the requested content. In one embodiment, the advertisement might be displayed within the requested content, including along a top, bottom, and/or side of the displayed requested content.

By employing the disclosed embodiments, an increased number of advertisement features may be determined (ads expansion features) and used to increase a likelihood that a given advertisement is selected for being more closely related to requested content. This is because it is typical for the requested content to have a large number of key words, and/or other characteristics, while an advertisement may have a much smaller number of Ad keywords in comparison. Thus, determining a match of content to a given advertisement is often difficult. However, the present disclosure presents mechanisms for increasing a number of words (phrases, and/or unigrams) useable to perform the match, by taking advantage of the intrinsic knowledge available on the Internet, or similar network.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, Intelligent Feature Expander Server (IFES) 106, Ad server 107, and content server 108.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as content server 108, IFES 106, or the like. Such user account, for example, may be configured to enable the user to receive emails, send/receive IM messages, SMS messages, access selected web pages, or participates in any of a variety of other social networking activity. However, managing of messages or otherwise participating in other social activities may also be performed without logging into the user account. In one embodiment, the user of client devices 101-

104 may also be enabled to access a web page, perform a query search for various content, or other perform any of a variety of other activities.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple IFES 106, content server 108, ad server 107, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Figure 6:
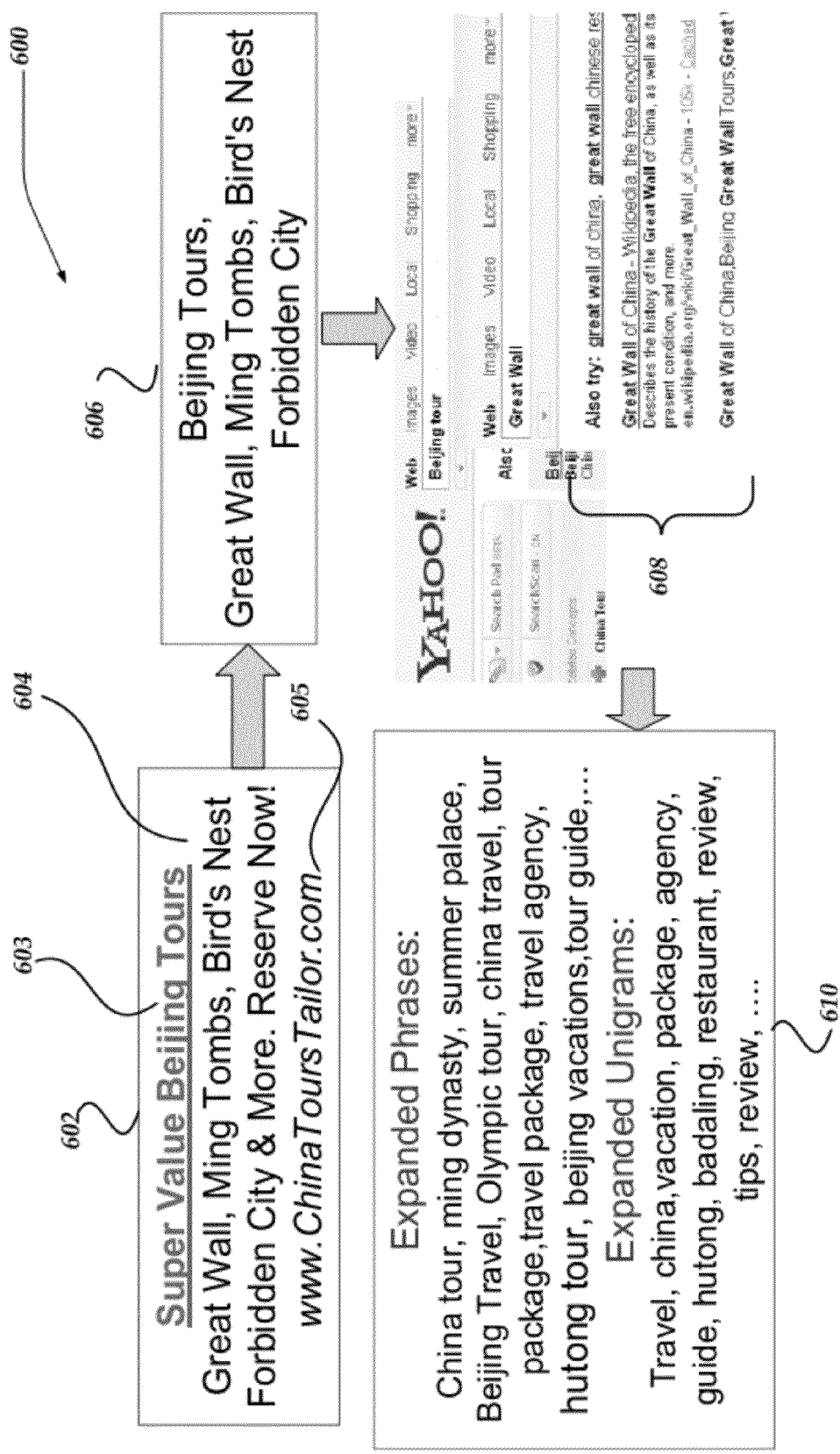
FIG. 6 illustrates one non-limiting example of an advertisement used to generate expanded phrases and unigrams for use in an advertisement feature expansion.

Ad server 107 includes one or more network devices that are configured to provide advertisements that may be displayed to a client device, such as client devices 101-104. In one embodiment, an advertisement may include a variety of different digital data, including, but not limited to motion pictures, movies, videos, music, audio files, text, graphics, and/or any combination of digital data formats. In one embodiment, an advertisement may be provided to IFES 106, and/or content server 108, for possible inclusion with content to a client device. In one embodiment, an advertisement might be provided with textual information that might include a description of the advertisement, a title of the advertisement, a Uniform Resource Locator (URL) or other location indicator. One non-limiting example of such advertisement information is illustrated in FIG. 6, as advertisement information 602 showing a title 603, description 604, and URL 605 for the advertisement. In one embodiment, the advertisement might be its advertisement information, or, in another embodiment, the advertisement information might be in addition to advertisement. In any, the advertisement may be provided to IFES 106 for storage in an advertisement store. However, in another embodiment, Ad server 107 might include the advertisement store for a plurality of advertisements for which IFES 106 and/or content server 108 might then request an advertisement.

Content server 108 represents one or more network devices that are configured to provide content to client devices 101-104. In one embodiment, the content may be provided to a client device based on a request for the content. However, in another embodiment, content server 108 may also provide content to a client device based on a push mechanism, wherein the content might not be requested content. Such content might include any of a variety of content that might be provided to a client device over a network, including web pages, search query results, download requests, or the like. For example, such content might also take the form of a message, such as an email message, an instant message, or the like.

In one embodiment, the content might include a location for which one or more advertisements might be placed within. Thus, in one embodiment, content server 108 might send a request for an advertisement to be displayed with the content, where the request for the advertisement might be sent to IFES 106. However, in another embodiment, the content might be sent to IFES 106 to be modified with an advertisement that is selected by IFES 106.

One embodiment of IFES 106 is described in more detail below in conjunction with FIG. 3. Briefly, however, IFES 106 is configured to analyze an advertisement and its related advertisement information to determine expanded or enriching features about the advertisement that may then be subsequently used to improve matching of the advertisement to content to be provided to a client device. Thus, in one embodiment, IFES 106 might receive the advertisement with Ad keywords, along with other advertisement information. IFES 106 may then perform an ad feature expansion action to identify expanded ad features for the advertisement. IFES 106 may generate an expanded ad index with the expanded ad features, including the provided Ad keywords for the received advertisement. When it is determined that content is to be delivered to a client device, in one embodiment, IFES 106 may determine keywords from the content to be delivered. IFES 106 may then compare the content keywords to the generated expanded ad index to determine whether a match or number of matches above a threshold of the content keywords and Ad index are detected for a given advertisement or advertisements If so, the given advertisement(s) is/are then provided for display with the content. In one embodiment, IFES 106 may employ processes such as described below in conjunction with FIGS. 4-5 to perform at least some of its actions.

Devices that may operate as ad server 107, content server 108, and IFES 106 include, but are not limited to personal computers, desktop computers, multiprocessor systems, microprocessor-based or programmable consumer electronics, network PCs, servers, network appliances, and the like.

Although IFES 106 is illustrated as a distinct network device, the invention is not so limited. For example, a plurality of network devices may be configured to perform the operational aspects of IFES 106. However, in another embodiment, functionality of ad server 107, content server 108, and IFES 106 might be performed using a single network device. Moreover, in another embodiment, ad server 107 might provide the advertisement and advertisement information to IFES 106 for analysis, and then receive and store the expanded ad index with Ad server 107 and/or content server 108 for later use. Thus, it should be recognized that while three distinct network devices are illustrated, the operations of such network devices may be combined and/or shared across virtually any arrangement. Thus, the invention is not limited to a particular arrangement of devices or distribution of functions, and other configurations are also envisaged. Therefore, system 100 should not be construed as limiting the invention.

Illustrative Client Environment

Figure 2:
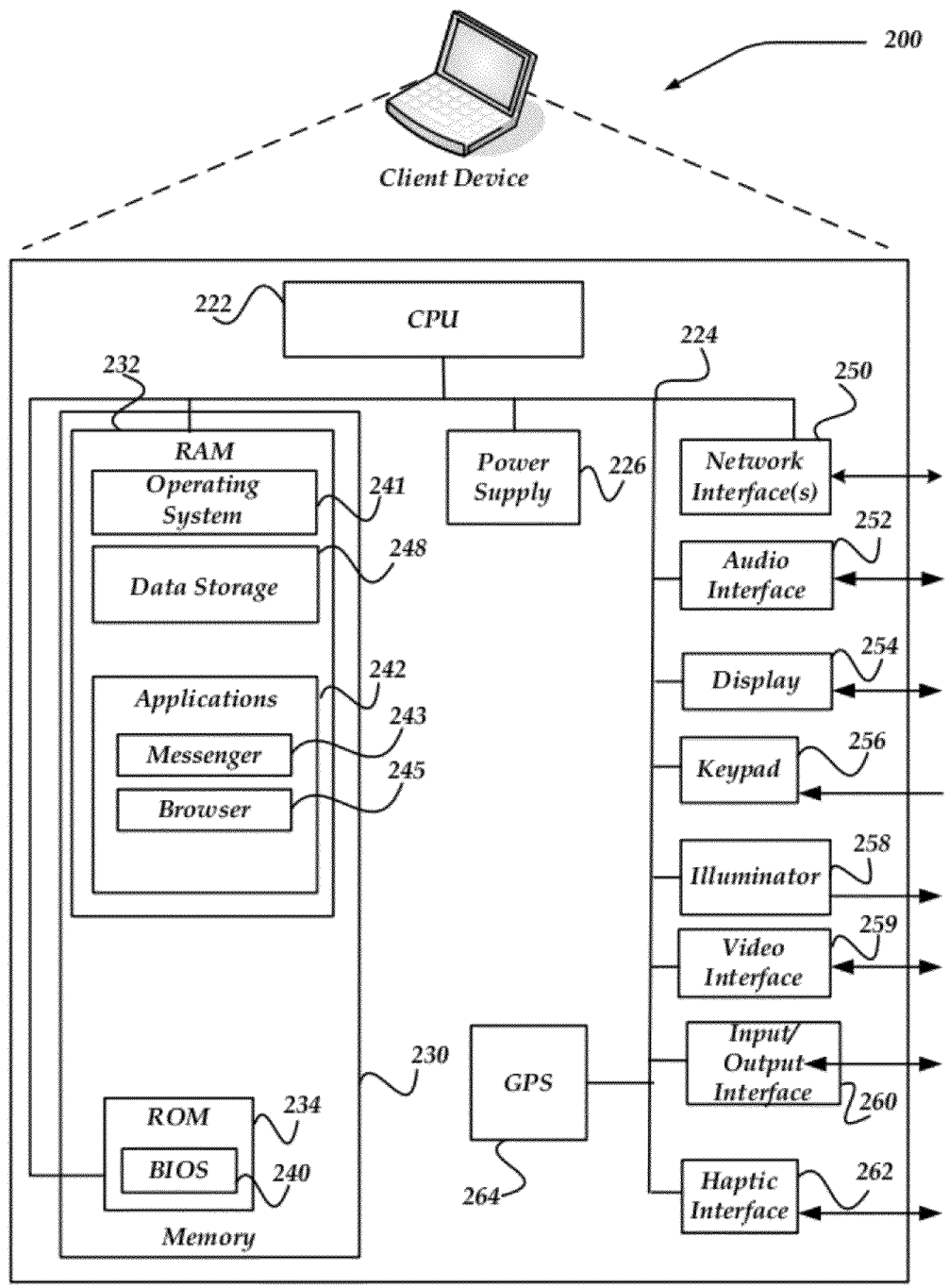
FIG. 2 shows one embodiment of a client device that may be included in a system implementing various embodiments.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage devices. Mass memory 230 illustrates another example of computer readable storage media as storage devices for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200, as well as store an identifier. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 248 may also be employed to store personal information including but not limited to contact lists, personal preferences, data files, graphs, videos, or the like. At least a portion of the stored information may also be stored on a disk drive or other storage medium (not shown) within client device 200.

Applications 242 may include computer executable instructions which, when executed by client device 200 within a processor such as CPU 222, may perform actions, including, transmit, receive, and/or otherwise process messages (e.g., SMS, MMS, IM, email, and/or other messages), multimedia information, and enable telecommunication with another user of another client device, as well as perform other actions associated with one or more applications, operating system components, and the like. Other examples of application programs include calendars, browsers, toolbar applications, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed. Moreover, browser 245 may be employed to request various content and/or receive such content, along with one or more advertisements. In one embodiment, browser 245 might also be employed to perform one or more search query requests over a network, such as the Internet, or the like, and to request along with search results, one or more advertisements in response. In one embodiment, at least one advertisement might have been selected for inclusion based on mechanisms such as those described further below.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, gmail, or the like. In another embodiment, messenger 243 may be a client application that is configured to integrate and employ a variety of messaging protocols. In one embodiment, a message may also be received that includes one or more advertisements that are selected based on mechanisms such as those described further below.

Illustrative Network Device Environment

Figure 3:
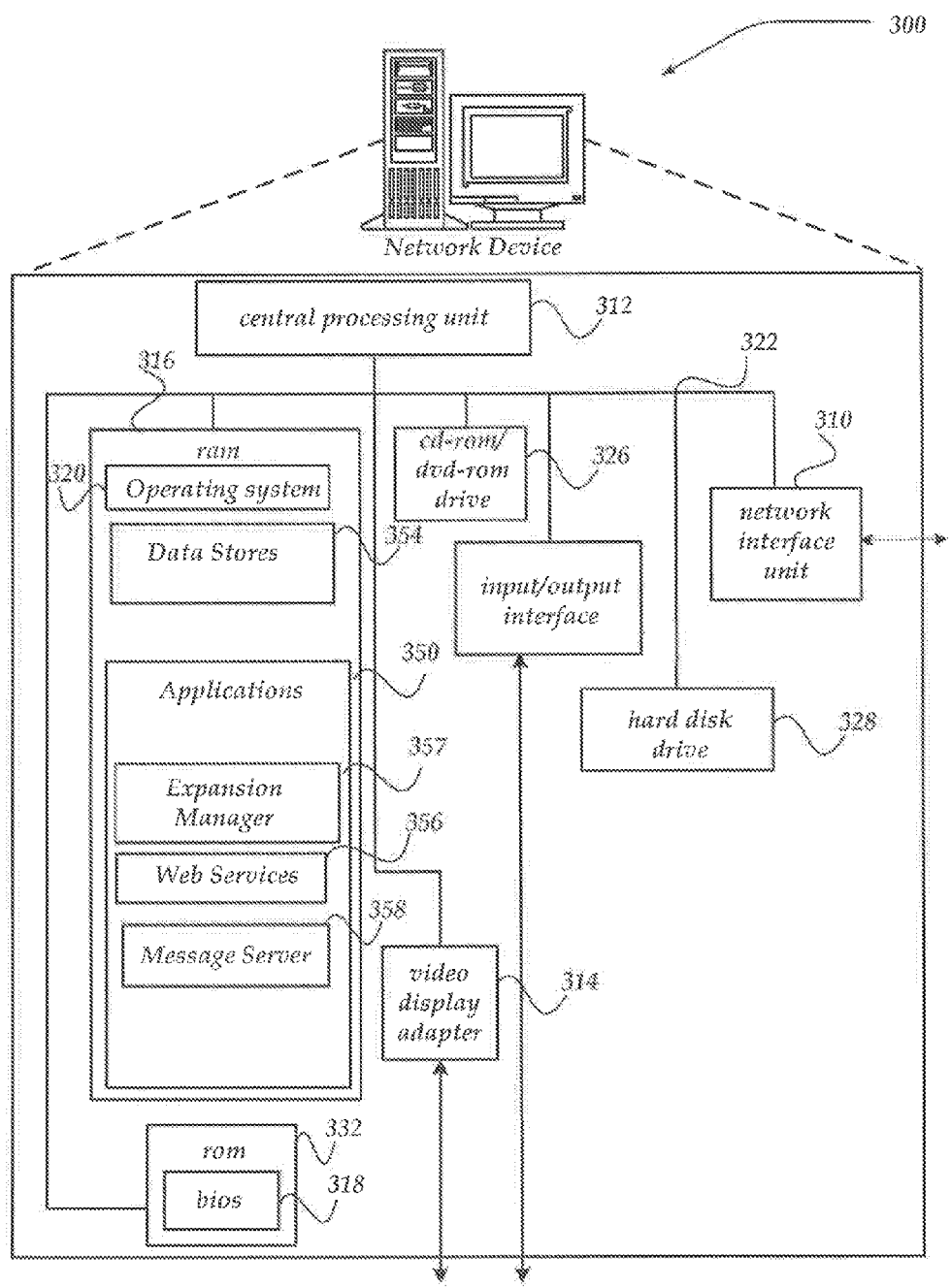
FIG. 3 shows one embodiment of a network device that may be included in a system implementing various embodiments.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, a combination of IFES 106 and/or content server 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk rive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Such computer-readable media are physical devices. Computer-readable storage media may include volatile, non-volatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

The mass memory also stores program code and data. For example, mass memory might include data stores 354. Data stores 354 may be include virtually any mechanism usable for store and managing data, including but not limited to a file, a folder, a document, or an application, such as a database, spreadsheet, or the like. Data stores 354 may manage information that might include, but is not limited to web pages, account information, or the like, as well as scripts, applications, applets, and the like. Data stores 354 may also include advertisements; advertisement information including but not limited to ad keywords, titles, descriptions, URLs, or the like; expanded Ad index, content index, content, search data stores, or the like. At least some of the data and other information stored within data stores 354 may be stored in part or in whole on other computer readable storage media including, hard disk drive 328, cd-rom/dvd-rom drive 326, or even on another remote network device.

One or more applications 350 may be loaded into mass memory for execution by central processing unit 312 to perform various actions. Such applications 350 may include, but are not limited to HTTP programs, customizable user interface programs, IPSec applications, encryption programs, security programs, VPN programs, web servers, account management, and so forth. Applications 350 may include web services 356, Message Server (MS) 358, and expansion manager 357.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. In at least one web page provided through web services 356, might include a tag, content keywords, or other information, useable to identify information characteristics of the web page. In at least one embodiment, the web page content keywords, or the like might be stored in data stores 354 and identified as being associated with the web page through various linking or pointer mechanisms. However, the invention is not constrained to web pages (or search results, or the like) having already defined content keywords. For example, in one embodiment, as a web page (search result, or the like) is to be provided to a client device, an analysis might be performed upon the web page (search result, or the like) to identify a plurality of content keywords for the web page (search result, or the like).

Message server 358 may include virtually any computing component or components configured and arranged to forward messages from message user agents, and/or other message servers, or to deliver messages to a local message store, such as data stores 354, or the like. Thus, message server 358 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like. In one embodiment, content keywords may be automatically identified for a given message based on the message content, title, a flow of related messages, or the like.

It should be noted, however, that message server 358 is not constrained to email messages, and other messaging protocols may be managed by one or more components of message server 358. Thus, message server 358 may also be configured to manage SMS messages, IM, MMS, IRC, mIRC, or any of a variety of other message types.

Expansion manager 357 is configured to perform actions to analyze an advertisement and its related advertisement information to determine expanded or enriching features about the advertisement that may then be subsequently used to improve matching of the advertisement to content to be provided to a client device. Thus, in one embodiment, expansion manager 357 might receive the advertisement with Ad keywords, along with other advertisement information. Expansion manager 357 may then perform ad feature expansion actions to identify expanded ad features for the advertisement. In one embodiment, the ad feature expansion actions may include utilitizing knowledge from the Internet to help enrich the ad features that are determined to be relevant to a given advertisement. Expansion manager 357 may generate an expanded ad index with the expanded ad features, including the provided Ad keywords for the received advertisement. When it is determined that content is to be delivered to a client device, in one embodiment, expansion manager 357 may determine keywords from the content to be delivered. Expansion manager 357 may then use the content keywords and the generated expanded ad index to determine whether a match or number of matches above a threshold are detected for a given advertisement or advertisements If so, the given advertisement(s) is then provided for display with the content. In one embodiment, IFES 106 may employ processes such as described below in conjunction with FIGS. 4-5 to perform at least some of its actions.

Generalized Operation

Figure 4:
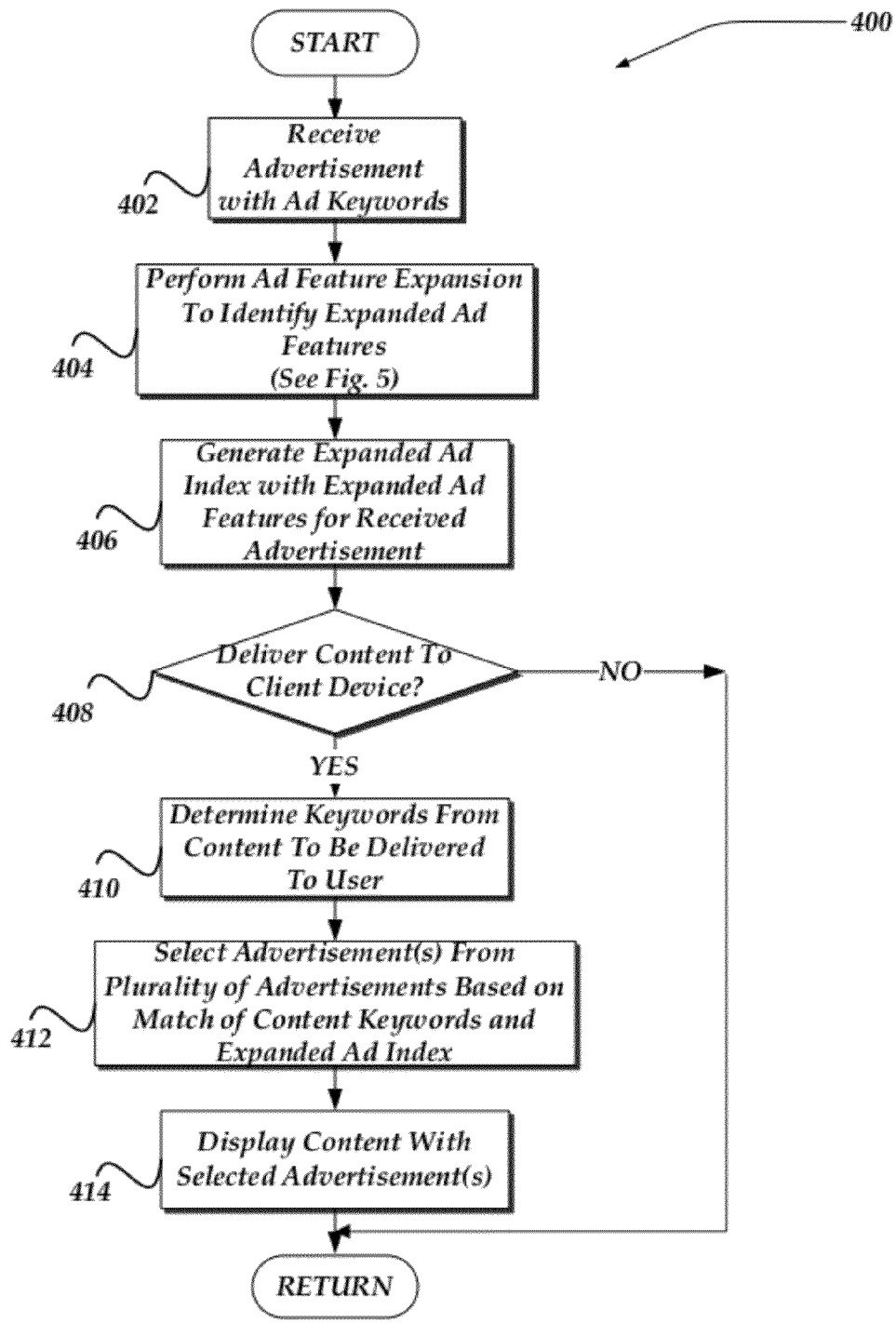
FIG. 4 illustrates a logical flow diagram generally showing one embodiment of an overview process for selecting advertisements to display at a client device based on a content request.

The operation of certain aspects of the invention will now be described with respect to FIGS. 4-5. FIG. 4 illustrates a logical flow diagram generally showing one embodiment of an overview process for selecting advertisements to display at a client device based on a content request. Process 400 of FIG. 4 may be implemented within network device 300 of FIG. 3, in one embodiment.

Process 400 begins, after a start block, at block 402, where an advertisement is received. In one embodiment, the advertisement may be received from an advertiser along with various other advertisement information, including, for example Ad keywords. The advertisement may include a title, a description section, and or a link identifier, such as a URL or the like. In one embodiment, such information may also be included distinct from the advertisement, for example, where the advertisement is a graphic, an audio clip, a video clip, or the like.

Processing then flows to block 404, which is described in more detail below in conjunction with FIG. 5. Briefly, however, at block 404, knowledge from searches of the Internet, and/or other networks, are performed to glean additional information about the advertisement that may then be used to identify expanded advertisement (Ad) features for the advertisement. Such expanded Ad features may include single words or unigrams, and/or phrases. Thus, as used herein references to phrases also refer to single words or unigrams, unless such references make such distinction explicit. In any event, process 400 flows next to block 406, where the expanded Ad features are used to generate an expanded Ad index for the received advertisement. It should be understood that blocks 402, 404 and 406 may be repeated for a plurality of advertisements.

Continuing to decision block 408, a determination is made whether content is to be delivered to a client device. The content may represent a web page, a message, a result of a search query, and/or a variety of other content. In one embodiment, the content may be requested by the client device, such as a request for a web page, a search request, a request for a message, or the like. However, the content might also be delivered to the client device based on a push mechanism, such as might arise from an alert message, or the like. In any event, if content is to be delivered to a client device, processing flows to block 410; otherwise, processing may return to a calling process to perform other actions. For example, as noted above, the process may be repeated for additionally received advertisements.

At block 410, keywords, tags, or the like, may be obtained for the content. In one embodiment, a content author, or other analysis mechanism might generate the content keywords, tags, or the like. In any event, processing flows to block 412, where the content keywords are compared to the Ad index information (expanded Ad index) to identify one or more matches. In one embodiment, a threshold number of keyword matches might be employed to identify that a given advertisement may be a relevant match for the content. For example, in one embodiment, if two or more content keywords match two or more Ad keywords, expanded phrases, expanded unigrams, or the like, in the expanded Ad index for a given advertisement, then that advertisement might be selected as relevant to the content. Other threshold values besides two may also be used, however, and therefore, the invention is not constrained to two. For example, any value from one to the number of phrases/unigrams associated with a given advertisement might be used. Moreover, it is recognized that several advertisements might have matches that exceed the threshold. In such event, each advertisement might be selected. However, in another embodiment, the advertisement matches might be ranked ordered, and a subset of the advertisements might be selected based on the rank ordering. For example, those advertisements having a highest number of matched keywords above another threshold might be selected.

Processing then flows to block 414, where the selected advertisement(s) are provided along with the content for display at the client device. It should be noted, that at least some advertisements might actually be played, as an audio clip. Thus, as used herein display of an advertisement includes playing audio advertisements as well. Processing then returns to a calling process to perform other actions. It should be noted, that in at least one embodiment, where no advertisement is determined to have a match(es) above the threshold number of matches, several actions may be performed. Such actions might include, but are not limited to, not providing any advertisement for display.

Figure 5:
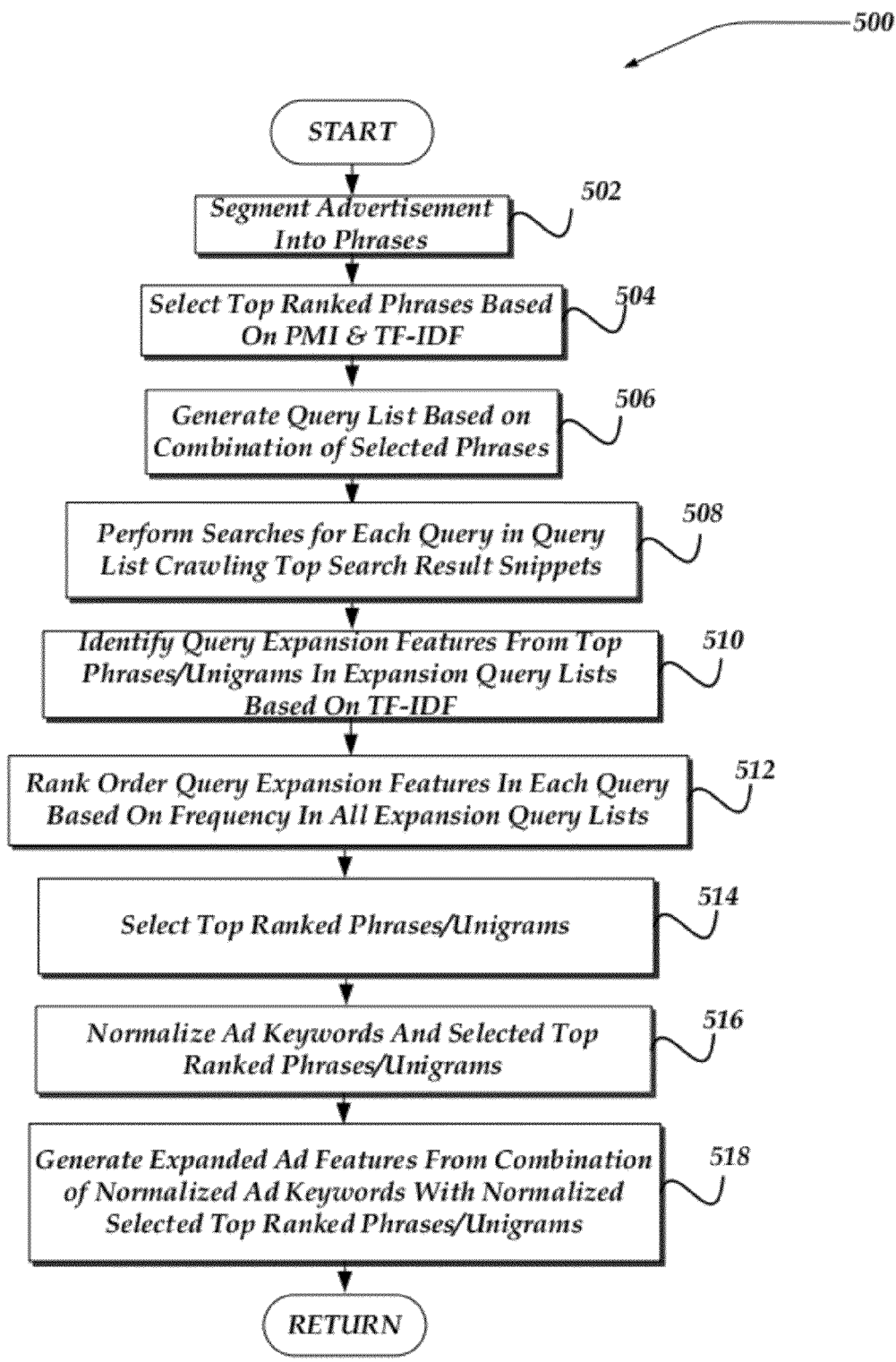
FIG. 5 illustrates a logical flow diagram generally showing one embodiment of a process for determining an advertisement feature expansion for a given advertisement using knowledge gleaned from at least one internet search.

FIG. 5 illustrates a logical flow diagram generally showing one embodiment of a process for determining an advertisement feature expansion for a given advertisement using knowledge gleaned from at least one internet search. Process 500 of FIG. 5 may represent one embodiment, of block 404 of FIG. 4. Further, process 500 may also be performed within network device 300 of FIG. 3.

To assist in understanding process 500 of FIG. 5, a non-limiting, non-exhaustive example is provided in FIG. 6. Thus, FIG. 6 illustrates one non-limiting example of an advertisement used to generate example expanded phrases and unigrams for use in an advertisement feature expansion. As shown in components 600 of FIG. 6 is advertisement 602 that includes title 603, description 604, and link or URL 605. In one embodiment, an advertiser may provide Ad keywords that might include, for example, "Beijing tours, great wall, and Ming tombs."

Process 500 begins, after a start block, at block 502, where the advertisement may be segmented to identify phrases. In one embodiment, various phrases may be identified through a dictionary comparison to identify which words might be related. Thus, in one embodiment, it might be determined that "Super" and "Value" are related as a phrase, while "Beijing Tours" are also related.

Continuing to block 504, the identified phrases are then ranked based on their sum of pointwise mutual information values with the provided Ad keywords and TF-IDF scores. A pointwise mutual information (PMI), briefly, is a measure of association of two items. In one embodiment, it may be determined based on a log of probabilities. Thus, for two pairs of outcomes, x and y belonging to discrete random variables, the PMI may be determined as:

$$PMI(x,y)=\log [p(x,y)/(p(x)p(y))].$$

where the various probabilities may be identified through prior analysis over a plurality of different content, including web pages extracted from the Internet, or the like. In one embodiment, the different content, probabilities, and the like, may be stored in a dictionary, data store, or the like. In one example, then for a given phrase, such as "Beijing Tours," the PMIs for each provided Ad keyword may be determined, and summed:

$$\Sigma_i \, PMI(phrase, Ad \; keyword).$$

In one embodiment, the TF-IDF may also be used to further identify phrases of possible interest, by providing different weights for phrases in an ad title, ad keywords, and/or description. Briefly, TF-IDF is a weighting function that provides a statistical measure useable to evaluate how important a word is to a document in a collection or corpus, such as described above for a plurality of different content. The importance of a phrase tends to increase proportionally to a number of times a word or phrase appears in a document, but is then offset by the frequency of the word or phrase in the corpus. Thus, the number of times a term occurs in a document is called its term frequency. However, because some words may be too common, such as 'the' or the like, the term frequency might tend to incorrectly emphasize documents that happen to include the use of the word "the" without giving appropriate weight to other words. Thus, the IDF or inverse document frequency factor is incorporated to diminish a weight of terms that occur very frequently in the collection and increases the weight of terms that occur rarely. In one embodiment, the term frequency may be determined as:

$$TF_{i,j}=n_{i,j}/\Sigma_k n_{k,j}$$

where $n_{i,j}$ is a number of occurrences of the considered term ($t_i$) in a document $d_j$, and the denominator is a sum of the number of occurrences of all terms in document $d_j$.

The inverse document frequency may be determined as:

$$IDF_i=\log(|D|/|\{d:t_i \in d\}|+1)$$

Where |D| is a total number of documents in the corpus; and $|\{d:t_i \in d\}|+1$ is a number of documents where the term $t_i$ appears. The TF-IDF may be determined as:

$$(TF\text{-}IDF)_{i,j}=TF_{i,j} X IDF_i$$

The resulting TF-IDFs may then be rank ordered. In one embodiment, a top ranked set of phrases may be selected. In one embodiment, a top 8-12 phrases might be selected. However, other number of top ranked phrases may also be selected. For example, referring to FIG. 6, additional phrases may be identified, including those listed in list 606. Thus, in addition to the Ad keywords, "bird's nest," and "forbidden city," might be selected as part of the top ranked phrases.

Moving next to block 506, a query list is generated based on a combination of the identified key phrases from block 504. Various mechanisms may be used to generate the search queries. For example, in one embodiment, a query list of phrases may be generated as follows:

$q=phrase_i$ if(length of the phrase is $>X$), else $q=phrase_0+phrase_i$ if(length of phrase$_i$ is $\leq X$)

where X may be any value. For example, in one embodiment, X might be between 2-4. For example, where X is three, then for the example illustrated in FIG. 6, the phrase "Great Wall" includes two words. Therefore, it is less than three, query q would be generated by combining "Great Wall" with "Beijing Tours". In any event, a plurality of queries would be generated to generate a query list based on the selected set of phrases.

Continuing to block 508, for each query within the query list, an internet web search may be performed to generate a plurality of search result snippets. For example, if four queries are performed, then four sets of search result snippets may be generated. Each of the top Y number of result snippets may be examined. In one embodiment, Y may be 100. However, other values may also be selected for Y including, for example, virtually any number between 50-1000.

Proceeding to block 510, an analysis is performed on each set of selected search result snippets to select another set of phrases denoted as a query expansion feature set for each query. In one embodiment, the analysis may include selecting those phrases having a TF-IDF that exceeds some defined threshold. In one embodiment, a top 100 phrases might be selected for each query. Again, other values may be selected.

Processing continues to block 512, where the selected phrases in the query expansion feature set may be ranked based on a ranking in each query and a frequency in all query expansion lists. That is, a score may be determined for each phrase as:

$$\text{Score}(\text{phrase}_k) = \Sigma_{i=1-N}(1/\text{rank}(k_i))$$

For each phrase k, over each of the N queries. In one embodiment, at block 514, top ranked phrases may be selected. In one embodiment, the number of top ranked phrases selected might be 100. However, other values may be used.

Flowing next to block 516, the Ad keywords and the selected top ranked phrases may be weighted to normalize their results. Proceeding to block 518, the normalized values may then be combined to generate an expanded Ad features set. In one embodiment, the normalization and combination may be performed using a linear combination, such as:

$$F = \text{norm}\{ad\_f_i\} \cup \text{norm}\{ex\_f_j\}$$

Where $ad\_f_i$ represents the weighted value for Ad keyword i, and $ex\_f_j$ represents the weighted value for expanded phrase j. As illustrated in FIG. 6, then list 610 may represent a set of expanded key phrases (and unigrams) that result from the analysis performed above. As can readily be seen, such expanded features shown in list 610 are directed towards providing for an improved opportunity for matching content keywords over merely using the provided advertisement information including Ad keywords.

The combined results may then be returned for use in generating, other otherwise building an Ad index for the received advertisement. In any event, processing then returns to a calling process. Further, when a request for an advertisement is performed, content, such as search results 608 may be analyzed to generate content keywords that may then be used to determine whether a match or matches above a threshold are determined for a given advertisement's expanded Ad features.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device configured to send and receive data over a network, the network device comprising:
   at least one non-transitory storage medium comprising at least one set of instructions for feature expansions of online advertisements;
   at least one processor in communication with the at least one non-transitory storage medium and configured to execute the at least one set of instructions to:
      receive an advertisement with Ad keywords associated with the advertisement;
      segment content of the advertisement into a plurality of phrases;
      perform a semantic analysis to the plurality of phrases;
      select top-ranked phrases from the plurality of phrases based on the semantic analysis to form a reduced subset of phrases
      generate a query list having a plurality of queries by combining each phrase in the reduced subset of phrases that has less than a defined number of words with another independent phrase in the reduced subset of phrases to create queries comprising two or more words;
      for each query within the query list, perform an internet web search to identify a set of descriptions, each description describing a search result from the internet web search;
      select a second set of phrases denoted as a query expansion feature set for each query based on an analysis of the set of descriptions;
      rank the second set of phrases;
      generate an expanded Ad index, wherein to generate the expanded Ad index the at least one processor is configured to:
      select from the ranked second set of phrases a subset of phrases as an ad expanded feature set; and
      combine the ad expanded feature set with the Ad keywords associated with the advertisement; and
      when in receipt of a request to provide to a client device a second content for display, select an advertisement from a plurality of advertisements based on the expanded Ad index.

2. The network device of claim 1, wherein to conduct the semantic analysis, the at least one processor is further configured to:
   group related of words from the content of the advertisement to generate a phrase from the content of the advertisement;
   determine a pointwise mutual information (PMI) value for each generated phrase with each Ad keyword;
   rank in order the determined PMI values based on a Term Frequency-Inverse Document Frequency (TF-IDF) score for each generated phrase; and select from the rank ordering a subset of phrases as the reduced subset of phrases for the advertisement.

3. The network device of claim 1, wherein the content of the advertisement comprises at least one of a title of the advertisement, a description of the advertisement, or a Uniform Resource Locator (URL).

4. The network device of claim 1, wherein to analyze the set of search result descriptions, the processor is further configured to identify a phrase with a Term Frequency-Inverse Document Frequency (TF-IDF) score for the second set of phrases above a threshold value, the second set of phrases being denoted as a query expansion feature set.

5. The network device of claim 1, wherein the second content for display further comprises at least one of a web page and a search result.

6. A non-transitory computer-readable storage device having computer executable instructions stored thereon, the computer-executable instructions configured to cause a processor to perform acts of:
    receiving an advertisement with Ad keywords associated with the advertisement;
    performing a semantic analysis to the plurality of phrases;
    segmenting content of the advertisement into a plurality of phrases;
        selecting top-ranked phrases from the plurality of phrases based on the semantic analysis to form a reduced subset of phrases;
        generating a query list having a plurality of queries by combining each phrase in the reduced subset of phrases that has less than a defined number of words with another independent phrase in the reduced subset of phrases to create queries comprising two or more words;
        for each query within the query list, performing an internet web search to identify a set of descriptions, each description describing a search result from the internet web search;
        analyzing the set of descriptions to select a second set of phrases denoted as a query expansion feature set for each query;
        ranking the second set of phrases within each query expansion feature set and a frequency over all query expansion feature sets;
        generating an expanded Ad index by selecting from the ranked second set of phrases a subset of phrases as an ad expanded feature set that is combined with the Ad keywords associated with the advertisement; and
        when receiving a second content for display at a client device, selecting an advertisement from a plurality of advertisements based on the expanded Ad index.

7. The non-transitory computer-readable storage medium of claim 6, wherein conducting the semantic analysis comprises:
    grouping related words from the content of the advertisement to generate a phrase from the content of the advertisement;
    determining a pointwise mutual information (PMI) value for each generated phrase with each Ad keyword;
    rank ordering the determined PMI values based on a Term Frequency-Inverse Document Frequency (TF-IDF) score for each generated phrase; and
    selecting from the rank ordering a subset of phrases as the reduced subset of phrases for the advertisement.

8. The non-transitory computer-readable storage medium of claim 6, wherein the content of the advertisement comprises at least one of a title of the advertisement, a description of the advertisement, or a Uniform Resource Locator (URL).

9. The non-transitory computer-readable storage medium of claim 6, wherein analyzing the set of descriptions further comprises identifying a phrase with a Term Frequency-Inverse Document Frequency (TF-IDF) score for the second set of phrases above a threshold value, the second set of phrases being denoted as a query expansion feature set.

10. The non-transitory computer-readable storage medium of claim 6, wherein the combined Ad keywords and ad expanded feature set further comprises, normalizing a weighting value for each Ad keyword and phrase within the ad expanded feature set prior to combining.

11. The non-transitory computer-readable storage medium of claim 6, wherein the second content for display further comprises at least one of a web page or a search result.

12. A computer-implemented method for managing content for delivery over a network, the method comprising:
    providing a networked device comprising a memory and a processor configured to execute instructions stored in the memory;
        receiving, by the processor, an advertisement with Ad keywords associated with the advertisement;
        segmenting, by the processor, content of the advertisement into a plurality of phrases;
        performing, by the processor, a semantic analysis to the plurality of phrases;
        selecting, by the processor, top-ranked phrases from the plurality of phrases based on the semantic analysis to form a reduced subset of phrases;
        generating, by the processor, a query list having a plurality of queries by combining each
    phrase in the reduced subset of phrases that has less than a defined number of words with another independent phrase in the reduced subset of phrases to create queries comprising two or more words;
        for each query within the query list, performing, by the processor, an internet web search to identify a set of descriptions, each description describing a search result from the internet search;
        selecting, by the processor, a second set of phrases denoted as a query expansion feature set for each query based on an analysis of the set of descriptions;
        ranking, by the processor, the second set of phrases;
        generating, by the processor, an expanded Ad index by selecting from the ranked second set of phrases a subset of phrases as an ad expanded feature set that is combined with the Ad keywords associated with the advertisement; and
        when receiving a second content for display at a client device, selecting, by the processor, an advertisement from a plurality of advertisements, including the received advertisement, based on the expanded Ad index.

13. The computer-implemented method of claim 12, wherein conducting the semantic analysis comprises:
    grouping related words from the content of the advertisement to generate a phrase from the content of the advertisement;
    determining a pointwise mutual information (PMI) value for each generated phrase with each Ad keyword;
    ranking in order the determined PMI values based on a Term Frequency-Inverse Document Frequency score for each generated phrase; and
    selecting from the rank ordering a subset of phrases as the reduced subset of phrases for the advertisement.

14. The computer-implemented method of claim 12, wherein the content of the advertisement comprises at least one of a title of the advertisement, a description of the advertisement, or a Uniform Resource Locator (URL).

15. The computer-implemented method of claim 12, wherein analyzing the set of descriptions comprises identifying a phrase with a Term Frequency-Inverse Document Frequency (TF-IDF) score for the second set of phrases above a threshold value, the selected other set of phrases being denoted as a query expansion feature set.

16. The computer-implemented method of claim 12, wherein combining the Ad keywords and ad expanded feature set comprises normalizing a weighting value for each Ad keyword and phrase within the ad expanded feature set prior to the combination.

17. The computer-implemented method of claim 12, wherein the client requested content further comprises a web page or a search result.

* * * * *